United States Patent [19]

Wheatley et al.

[11] Patent Number: 5,126,880
[45] Date of Patent: Jun. 30, 1992

[54] POLYMERIC REFLECTIVE BODIES WITH MULTIPLE LAYER TYPES

[75] Inventors: John A. Wheatley; Walter J. Schrenk, both of Midland, Mich.

[73] Assignee: The Dow Chemical Company, Midland, Mich.

[21] Appl. No.: 629,520

[22] Filed: Dec. 18, 1990

[51] Int. Cl.$^5$ .............................. G02B 5/28; B32B 7/02
[52] U.S. Cl. ..................................... 359/587; 359/584; 359/586; 428/213
[58] Field of Search ................................. 350/163–166; 428/423.3–480, 34, 195–220; 359/577–590, 900

[56] References Cited

U.S. PATENT DOCUMENTS

| | | | |
|---|---|---|---|
| 3,557,265 | 1/1971 | Chisholm et al. | 264/46.1 |
| 3,711,176 | 1/1973 | Alfrey, Jr. et al. | 350/166 |
| 3,759,647 | 9/1973 | Schrenk et al. | 425/133.5 |
| 3,773,882 | 11/1973 | Schrenk | 264/171 |
| 3,884,606 | 5/1975 | Schrenk | 425/133.5 |
| 4,187,336 | 2/1980 | Gordon | 428/34 |
| 4,310,584 | 1/1982 | Cooper et al. | 428/212 |
| 4,540,623 | 9/1985 | Im et al. | 428/220 |
| 4,793,669 | 12/1988 | Perilloux | 359/581 |
| 4,937,134 | 6/1990 | Schrenk et al. | 428/213 |
| 4,971,843 | 11/1990 | Michelotti et al. | 428/34 |
| 5,008,143 | 4/1991 | Armanini | 359/580 |

FOREIGN PATENT DOCUMENTS 244842 9/1989 Japan .................................. 359/580

OTHER PUBLICATIONS

Vasicek, "Optics of Thin Films", 1960; North-Holland Publishing Company; pp. 98–101, 139–142.

*Primary Examiner*—Bruce Y. Arnold
*Assistant Examiner*—Thong Nguyen

[57] ABSTRACT

A multilayered, highly reflective polymeric body comprising at least two types of optical layers which is thermoformable and capable of being fabricated into films, sheets and a variety of parts while maintaining a uniform reflective appearance is provided. The reflective polymeric body includes at least first and second diverse polymeric materials having a sufficient number of layers of the first and second polymeric materials such that at least 30% of light incident on the body is reflected. A portion of the layers have optical thicknesses between 0.09 and 0.45 $\mu$m, and the remaining layers have optical thicknesses of not greater than 0.09 $\mu$m or not less than 0.45 $\mu$m. The first and second polymeric materials differ from each other in refractive index by at least about 0.03.

45 Claims, 7 Drawing Sheets

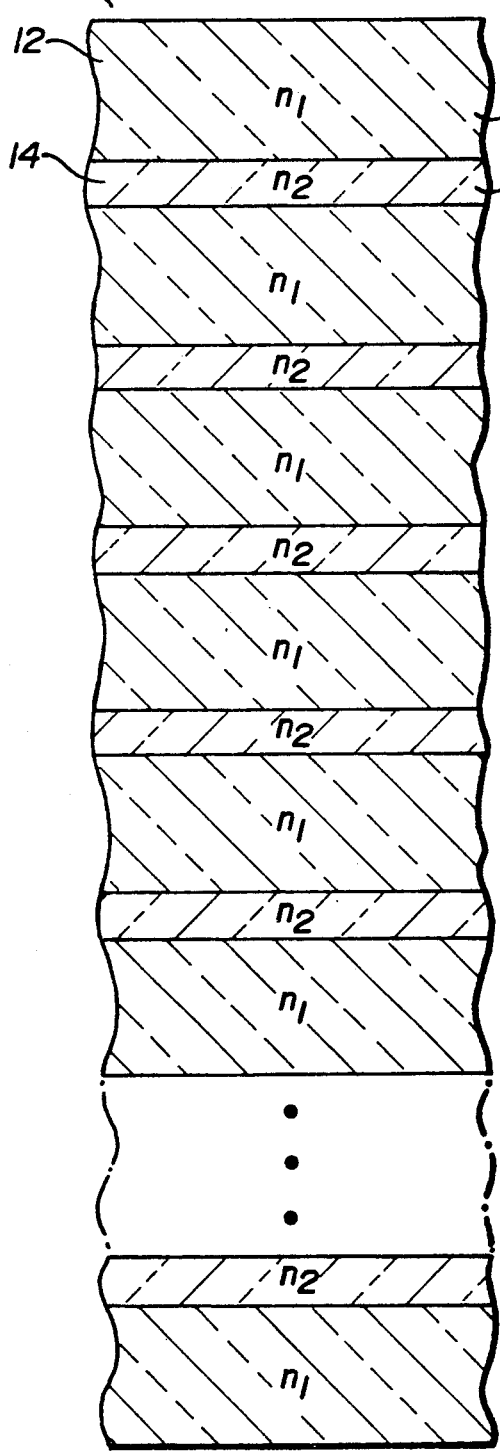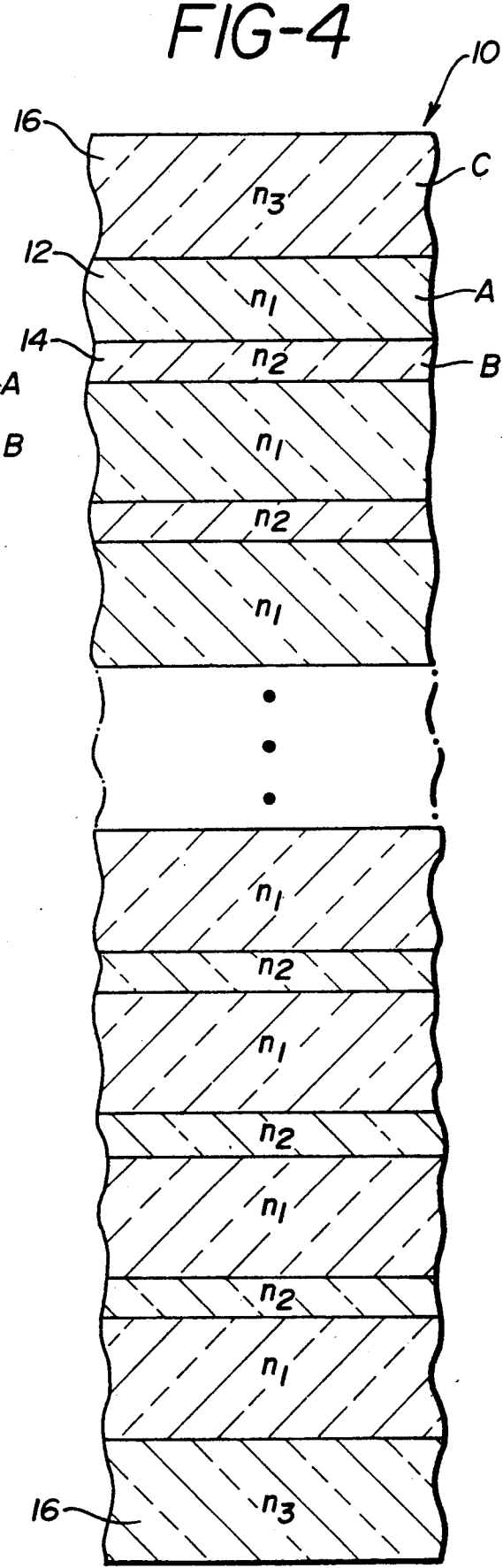

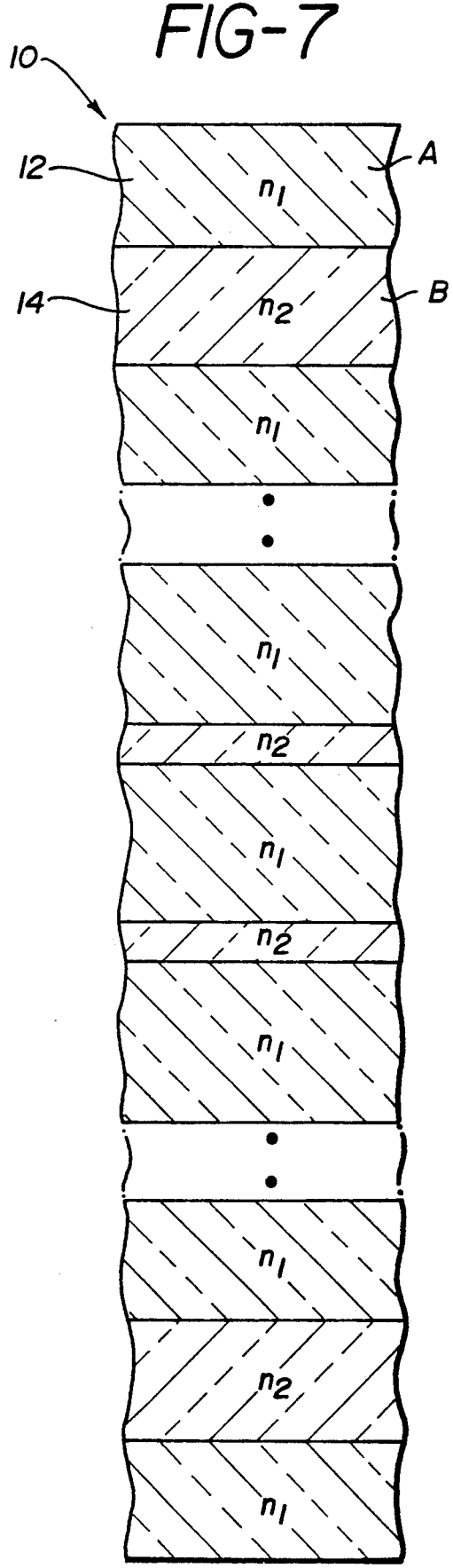
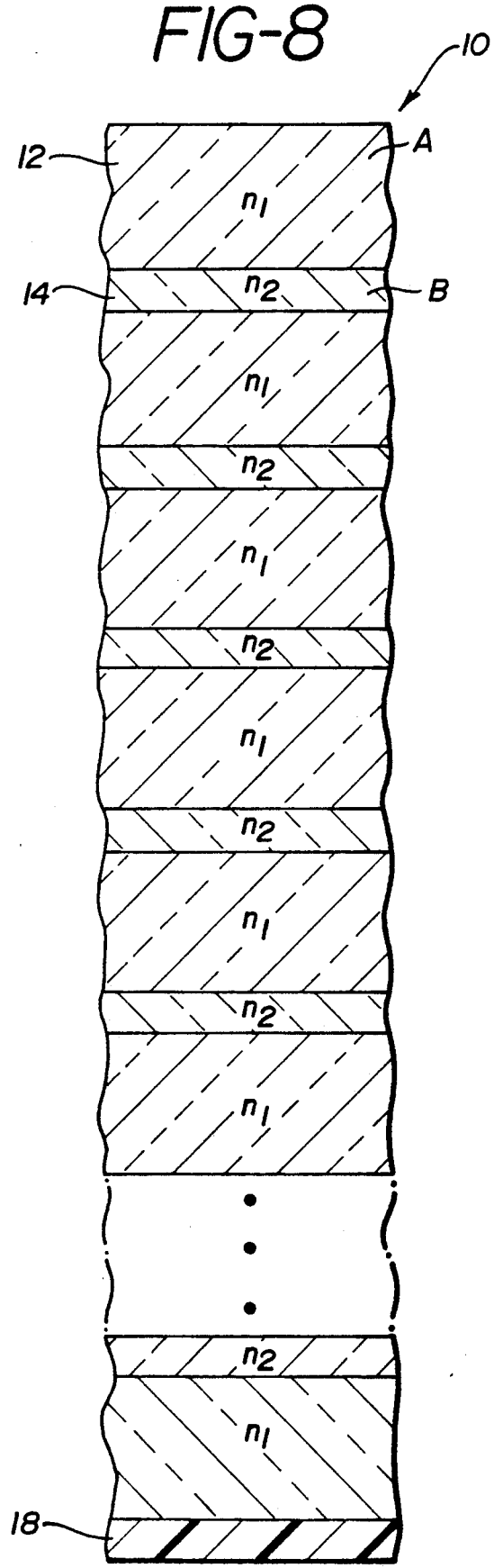

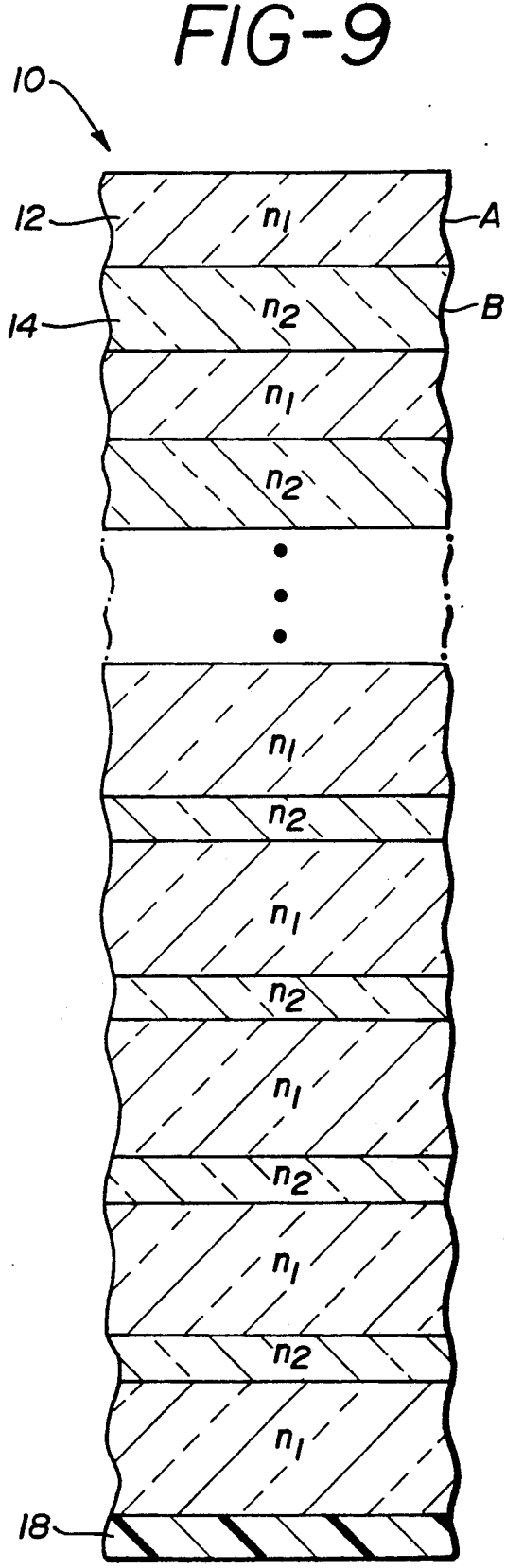
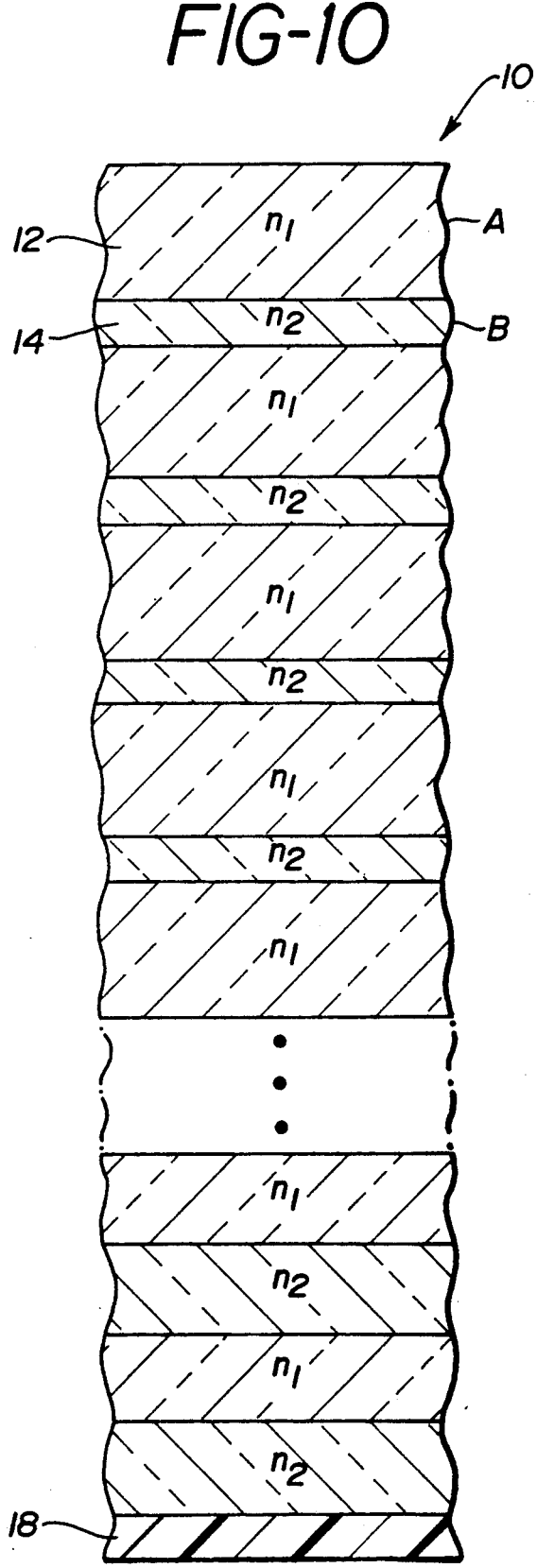

POLYMERIC REFLECTIVE BODIES WITH MULTIPLE LAYER TYPES

BACKGROUND OF THE INVENTION

The present invention relates to a multilayered polymeric body comprising multiple optical thickness layer types which reflects light and which can be fabricated to have a silvery or hued (i.e., copper, gold, etc.) metallic or nonconventional hued (i.e., blue, green, etc.) appearance, and to articles produced therefrom which may find use as mirrors, reflectors, lenses, polarizers, and the like.

Highly reflective articles (i.e., articles having a reflectance of 70-85% or greater) are generally sought by industry for a number of uses. Conventional methods for fabricating reflective surfaces include forming such surfaces of highly polished metals. Because of the high costs and fabricating problems involved in using metals, more recently fabricators have used plastic surfaces which contain thin coatings of metal thereon. Thus, metal coated plastic articles are now commonly found as both decorative and functional items in a number of industries. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like.

Typically, such metal coated plastic articles are formed by electroplating or by the vacuum, vapor, or chemical deposition of a thin metal layer on the surface of the article. Additionally, such coatings are subject to the chipping and flaking of the metal coatings as well as corrosion of the metal over time. If additional protective layers must be applied over the metal coating to protect it, additional labor and materials costs are involved. Further, there may be environmental disposal problems with some metal deposition processes.

Multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform or varying layer thicknesses. The number of layers may be multiplied by the use of a device as described in commonly-assigned U.S. Pat. No. 3,759,647 to Schrenk et al.

Im et al, U.S. Pat. No. 4,540,623, teach a multilayer laminated article which includes a polycarbonate as one of the alternating layers. The articles of Im et al, however, are intended to be transparent rather than reflective and to exhibit optical properties comparable to a pure polycarbonate polymer.

Alfrey, Jr. et al, U.S. Pat. No. 3,711,176, teach a multilayered highly reflective thermoplastic body fabricated using thin film techniques. That is, the reflective optically thin film layers of Alfrey, Jr. et al rely on the constructive interference of light to produce reflected visible, ultraviolet, or infrared portions of the electromagnetic spectrum. Such reflective optically thin films have found use in decorative items because of the iridescent reflective qualities of the film.

Although the film of Alfrey, Jr. et al exhibits a high reflectance, the iridescent qualities of the film cause it to reflect multiple colors, resulting in a "rainbow" effect. In addition, the optically thin films of Alfrey, Jr. et al are extremely sensitive to thickness changes, and it is characteristic of such films to exhibit streaks and spots of nonuniform color. Because the color reflected by such films is dependent on the angle of incidence of light impinging on the film, such films are not practical for uses which require uniformity of reflectivity. Moreover, such films are not practical to thermoform into articles as localized thinning of the layers during thermoforming causes alterations in the reflective characteristics of the films.

Accordingly, there remains a need in the art for a highly reflective polymeric sheet or body in which there is an absence of visibly perceived iridescent color. Further, there is a need for a highly reflective polymeric sheet or body which can be fabricated into a variety of parts without alteration of the uniform reflective appearance of the material over a range of processing conditions and part geometry, and which can be post formed without alteration of the uniform reflective appearance of the material. Still further, there is a need for silvery or metallic appearing articles which do not use metal.

SUMMARY OF THE INVENTION

The present invention meets those needs by providing a multilayered polymeric reflective body comprising multiple types of layers having differing optical thicknesses which has substantially no visibly perceived iridescent color, is highly reflective, post formable, and capable of being fabricated into a variety of parts while maintaining a uniform reflective appearance. The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15 degrees centered around the specular angle.

A specific intensity of reflectance, when used herein, is the intensity of reflection which occurs at a wavelength where negligible absorption occurs. For example, a silver appearing article reflects substantially all visible wavelengths (white light), whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflectance is referring.

According to one aspect of the present invention, a reflective polymeric body of at least first and second diverse polymeric materials is provided in which the first and second polymeric materials differ from each other in refractive index by at least about 0.03. The body should comprise a sufficient number of layers of the first and second polymeric materials such that at least 30% of light incident on the body is reflected. As used herein, the term "light" is meant to encompass not only visible light but also electromagnetic radiation in both the infrared and ultraviolet regions of the spectrum. The term "at least 30% of light incident on the body" refers, as discussed above, to reflected light at wavelengths where negligible absorption occurs.

The first and second polymeric materials should have optical thicknesses such that $P_f \leq 0.5$, where $P_f=(A-B)/B$, and where $P_f$ is the visual perception factor, A is the peak reflectance from the polymeric body, and B is the baseline reflectance from the polymeric body. By peak reflectance, we mean the highest value for reflectance which is measured within the wavelength range of interest. By baseline reflectance, we mean the average reflectance on either side of the peak wavelength band. Generally, the wavelength range of interest includes at least the visible spectrum. We have determined that for a $P_f$ value of 0.5 or less, substantially no iridescent interference color is perceived by an observer.

In a preferred embodiment of the invention, highly reflective bodies reflecting from 70–85% and greater of light incident on said bodies are provided by combining layers having an optical thickness of between 0.09 and 0.45 μm (i.e., optically thin layers) with layers having an optical thickness of not greater than 0.09 μm (i.e., optically very thin layers) or not less than 0.45 μm (i.e., optically thick layers). The thickness of the layers having an optical thickness of between 0.09 and 0.45 μm may have a gradient in optical thickness across the layers in the polymeric body.

As an alternative means of identifying polymeric bodies of the present invention exhibiting substantially no visibly perceived iridescent interference color, we have used the Munsell color system. In accordance with the invention, the layers of the first and second polymeric materials should have optical thicknesses and layer arrangements such that the Munsell chroma saturation value of light reflected from the reflective body is /3 or less. The Munsell color system is an art recognized system for measuring human perception of color which grades color ranging from no color to intense color. In this system, a chroma ranking of /2 indicates very near white, whereas a ranking of /10 or more indicates a very strong color. See, Syszecki and Stiles, *Color Science, Concepts and Methods, Quantitative Data and Formulas* (1967). Thus, we have found that a Munsell chroma value of /3 or less for the polymeric reflective body of the present invention reflects substantially white light with substantially no visibly perceived iridescent interference color.

Alternating optically thin polymer layers such as those taught by Alfrey, Jr. et al reflect a high percentage of light at certain wavelengths of light by constructive interference. By varying the layer thicknesses with the optically thin range (i.e., from 0.09 to 0.45 μm) by providing a gradient in optical thickness across the layers, a silvery, iridescent reflecting body may be produced having a relatively high reflectance over a wide range of the visible spectrum. However, a nonuniform, iridescent appearance is typical in such multilayer bodies because of sensitivity to layer thickness variations and dependence upon the angle of light incident on the bodies.

Optically very thin layers (i.e., less than 0.09 μm) as well as optically thick layers (i.e., greater than 0.45 μm) reflect substantially white light over a wide spectrum including both visible and infrared wavelengths. Multilayer bodies of alternating polymers which are optically very thin or optically thick possess a silvery, metallic appearance with an absence of visibly perceived iridescence.

We have found that with the judicious combination of multiple optical thickness layer types we can take advantage of the relatively high reflectance of optically thin alternating polymer layers to produce a highly reflective polymeric body but without the disadvantageous iridescent color effects. That is, we have found that by controlling the positioning and percentage of optically thin layers in the body, the reflectance of the body will be increased, but there will be substantially no visibly perceived iridescent color.

The contribution to the reflectivity of the body from the different types of layers is dependent on the position of the layers in the polymeric body. There are an essentially unlimited number of ways the different layer types can be combined to produce a multilayer body having substantially no visibly perceived iridescence. However, certain combinations are preferred because of ease of manufacture and enhanced reflectance. In one preferred embodiment, the portion of the layers having an optical thickness in the range of between 0.09 and 0.45 μm is positioned at one of the exterior surfaces of the body and the portion of the layers having an optical thickness of not greater than 0.09 μm or not less than 0.45 μm is positioned at the other exterior surface. The layer types may be laminated together, and the polymers making up the optically thin layers may be different than the polymers making up the optically thick or optically thick/very thin layers.

In an alternative embodiment, the portion of the layers having an optical thickness of not greater than 0.09 μm or not less than 0.45 μm is positioned at the exterior surfaces of the body, and the portion of the layers having an optical thickness between 0.09 and 0.45 μm is positioned in the interior of the body.

In yet another embodiment of the invention, the portion of the layers having an optical thickness of between 0.09 and 0.45 μm is positioned at the exterior surfaces of the body, and the portion of the layers having an optical thickness not greater than 0.09 μm or not less than 0.45 μm is positioned in the interior of the body.

A number of substantially transparent polymers are suitable for use in the present invention. In a preferred embodiment of the invention, the first polymeric material comprises a polycarbonate and the second polymeric material comprises a miscible blend of polyvinylidene fluoride and polymethyl methacrylate. In a variant of this embodiment, the first polymeric material comprises polystyrene and the second polymeric material comprises a copolymer of ethylene and at least one unsaturated monocarboxylic acid. In yet another variant of the embodiment, the first polymeric material comprises polystyrene and the second polymeric material comprises polymethyl methacrylate. In still another variation, the first polymeric material comprises a polycarbonate and the second polymeric material comprises polymethyl methacrylate. More than two different polymers may be present in the multilayer body. For example, the optically thin layers may comprise a pair of first and second polymers and the optically thick or optically thick/very thin layers may comprise a pair of different first and second polymers. The layer types may then be laminated together to form the reflective body.

The reflective polymeric body is preferably in the form of a sheet having two major exterior surfaces. An outer layer may be included as a surface or skin layer on both major exterior surfaces of the reflective body. The skin layer may be sacrificial or may be permanent and serve as a scratch resistant or weatherable protective layer. Further, such skin layers may be post applied to the body after coextrusion. For example, a skin layer may be applied as a sprayed on coating which acts to level the surface of the body to improve optical properties and impart scratch resistance, chemical resistance and/or weatherability. The skin layer may also be laminated to the multilayered body. Lamination is desirable for those polymers which are not readily coextrudable.

In certain embodiments of the invention, to obtain high reflectivity it is desirable to form the reflective polymeric body to comprise at least 500 or more layers. Increasing the total number of layers in the polymeric body has been found to increase its reflectivity (i.e., the percentage of incident light reflected from the body). Thus, by controlling the number of layers, the degree of reflectivity of the article may be controlled.

In another embodiment of the invention, the reflective body may be fabricated as a mirror-like polymeric article. To provide the mirror-like quality to the article, the body includes a pigmented layer, such as a layer containing black or other colored pigment. The use of a black or other dark pigment produces a layer which is principally light absorbent, while the use of a white pigment produces a layer which is principally light reflective. The pigmented layer may be coextruded or applied as a lacquer or paint. Thus, a mirror-like polymeric article is provided which has at least first and second major surfaces, with the article comprising a sufficient number of layers the first and second polymeric materials such that at least 30% of light incident on the body is reflected. A portion of the layers have optical thicknesses between 0.09 and 0.45 μm and the remaining layers have optical thicknesses of not greater than 0.09 μm or not less than 0.45 μm. The first and second polymeric materials differ from each other in refractive index by at least about 0.03.

The layers may be positioned such that the portion of the layers having an optical thickness in the range of between 0.09 and 0.45 μm is positioned at one of the exterior surfaces of said body, the portion of the layers having an optical thickness of not greater than 0.09 μm or not less than 0.45 μm is positioned in the interior of said body and the pigmented layer is positioned at the other exterior surface.

Alternatively, the portion of the layers having an optical thickness of not greater than 0.09 μm or not less than 0.45 μm is positioned at the exterior of the body, the portion of said layers having an optical thickness between 0.09 and 0.45 μm is positioned in the interior of said body and the pigmented layer is positioned at the other exterior surface.

In an alternative embodiment, the portion of the layers having an optical thickness of not greater than 0.09 μm or not less than 0.45 μm is positioned at the exterior surfaces of said body, the pigmented layer is positioned in the interior of said body, and portions of the layers having an optical thickness between 0.09 and 0.45 μm are positioned adjacent the pigmented layer on both sides thereof to produce a mirror-like reflection from both exterior surfaces of the body.

In yet another embodiment, the portion of the layers having an optical thickness of between 0.09 and 0.45 μm is positioned at the exterior surfaces of said body, the pigmented layer is positioned in the interior of the body, and portions of the layers having an optical thickness not greater than 0.09 μm or not less than 0.45 μm are positioned adjacent the pigmented layer on both sides thereof.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a two-sided mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

Further, the reflective polymeric body of the present invention may be post formed into concave, convex, parabolic, half-silvered, etc. mirrors. If suitable flexible or rubber polymers (elastomers) are utilized, the bodies may be bent or recoverably stretched into varying shapes. The mirror-like appearance may be accomplished by coextruding a black or otherwise light absorbing layer on one side of the body. Alternatively, one side of the final body may be coated with a colored paint or pigment to provide a highly reflective mirror-like body. Such mirrors would not be subject to breakage as would glass mirrors.

The reflective polymeric body of the present invention may also be fabricated to act as a birefringent light polarizer which reflects light anisotropically. The polarizer comprises multiple layers of at least first and second diverse polymeric materials, with a portion of the layers having an optical thickness of between 0.09 and 0.45 μm, and the remaining layers having an optical thickness of not greater than 0.09 μm or not less than 0.45 μm. The first and second polymeric materials should differ from each other in refractive index by at least 0.03 in one plane of the polarizer.

Additionally, the multilayer reflective polymeric bodies of the present invention may be formed into a number of decorative and/or structural parts. The bodies may be formed by coextrusion techniques initially into sheets which may then be post formed. Such post forming operations may include thermoforming, vacuum forming, or pressure forming. Further, through the use of forming dies, the multilayer reflective body may be initially formed into a variety of useful shapes including profiles, tubes, parisons which can then be formed into blow-molded containers, and the like.

Accordingly, it is an object of the present invention to provide a reflective polymeric body comprising multiple types of optical layers which lacks visibly perceived iridescent color, which can be fabricated into a variety of parts, is post formable, and which has an essentially colorless reflective appearance. This, and other objects and advantages of the invention will become apparent from the following detailed description, the accompanying drawings, and the appended claims.

BRIEF DESCRIPTION OF THE DRAWINGS

FIG. 3 is a schematic cross-section of a two component multilayer polymeric reflective body of the present invention, where the first polymer, A, has a refractive index, $n_1$, and the second polymer, B, has a refractive index, $n_2$;

FIG. 4 is a schematic cross-section of a two component multilayer polymeric reflective body having protective skin layers of a polymer, C, on both exterior surfaces thereof;

FIG. 7 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thick/very thin layers are positioned in the interior of the laminate and the optically thin layers are positioned at both exterior surfaces;

FIG. 8 is a schematic cross-section of a two component multilayer polymeric reflective body of the present invention, where the first polymer, A, has a refractive index, $n_1$, and the second polymer, B, has a refractive index, $n_2$, and where there is a pigmented layer on one of the exterior surfaces of the body;

FIG. 9 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thin layers are positioned at one of the exterior surfaces, the optically thick/very thin layers are positioned in the interior of the body, and there is a pigmented layer on the other exterior surface;

FIG. 10 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thick/very thin layers are positioned at one of the exterior surfaces, the optically thin layers are positioned in the interior of the body, and there is a pigmented layer on the other exterior surface;

DETAILED DESCRIPTION OF THE PREFERRED EMBODIMENTS

Figure 1:
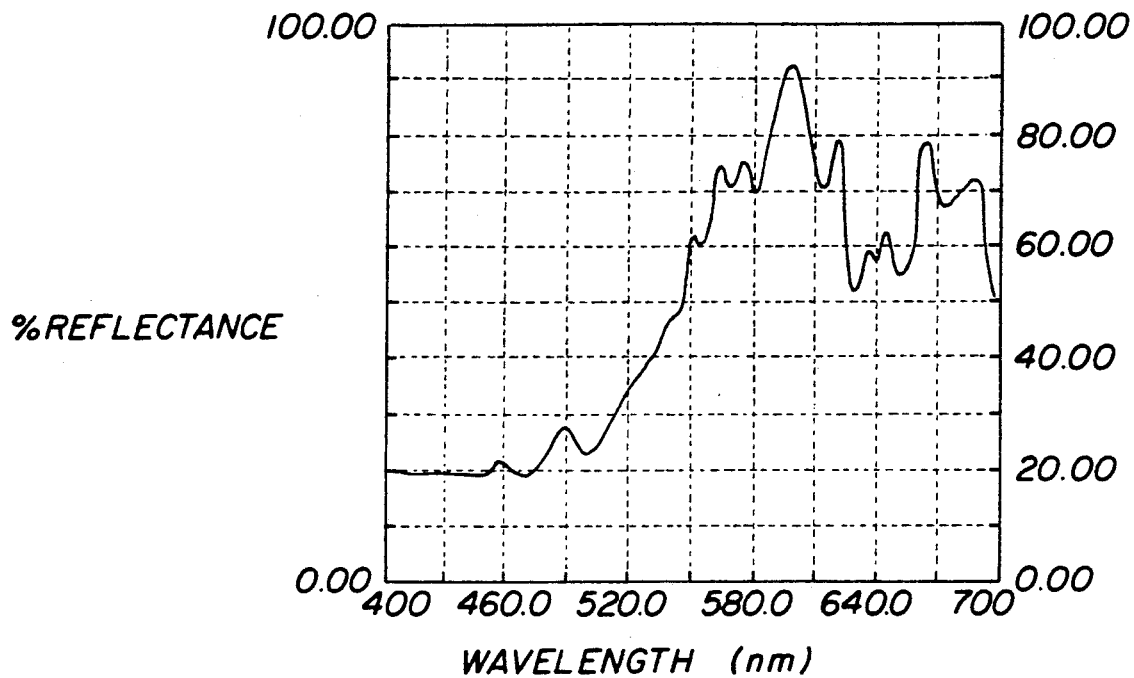
FIG. 1 is a graph illustrating the reflectance of an optically thin film made in accordance with Example 2.

The present invention provides a highly reflective multilayer polymeric body made up of from a hundred to several thousand layers of multiple types of optical layers. A portion of the layers of the polymeric materials are optically thin and have an optical thickness between 0.09 $\mu$m and 0.45 $\mu$m. The remaining layers are optically thick and have an optical thickness of not less than 0.45 $\mu$m, or are a combination of optically thick and optically very thin and have optical thicknesses of not more than 0.09 $\mu$m or not less than 0.45 $\mu$m, respectively, where the optical thickness is defined as the product of the individual layer thickness times the refractive index of the polymeric material which makes up that layer. Thus, the polymeric reflective body comprises a combination of optically thin layers of from 0.09 $\mu$m to 0.45 $\mu$m, optically thick layers of 0.45 $\mu$m or greater, and/or a combination of optically thick and very thin optical layers of 0.45 $\mu$m or greater and 0.09 $\mu$m or less.

For purposes of optical properties, i.e., reflectance and transmittance, an optically thin layer can be described as a layer having an optical thickness in the range of from $\lambda/4$ to $5\lambda/4$, where $\lambda$ represents the visible wavelength range. Thus, for layers to be used in the visible wavelength band, an optically thin layer has been described in the literature as one whose thickness, D, is less than about 0.5 $\mu$m or whose optical thickness, ND (where N is the refractive index of the material) is less than about 0.7 $\mu$m. Vasicek, *Optics of Thin Films* (1960) at pages 100 and 139.

Optically thin film layers rely on the constructive optical interference of light to produce intense reflected light in the visible, ultraviolet, or infrared portions of the electromagnetic spectrum according to the equation:

$$\lambda_m = (2/m)(N_1 D_1 + N_2 D_2),$$

where $\lambda_m$ is the reflected wavelength in nanometers, $N_1$ and $N_2$ are the refractive indices of the alternating polymers, $D_1$ and $D_2$ are the thickness of the respective layers of polymers in nanometers, and m is the order of reflection (m=1,2,3,4,5). Each solution of the equation determines a wavelength at which an intense reflection, relative to surrounding regions, is expected. The intensity of the reflection is a function of the "f-ratio" where, $$f = N_1 D_1 / (N_1 D_1 + N_2 D_2)$$

By proper selection of the f-ratio, one can exercise some degree of control over the intensity of reflection of the various higher order reflections. For example, first order visible reflections of violet (0.38 micrometer wavelength) to red (0.68 micrometer wavelength) can be obtained with layer optical thicknesses between about 0.075-0.25 μm.

The reflective characteristics of the optically thick/very thin layers of the present invention are governed by the following equation:

$$R = (kr)/(1 + (k-1)r) \times 100,$$

where R is the amount of reflected light (%), k is the number of optically thick or the number of optically thick and very thin layers, and $r = [(N_1 - N_2)/(N_1 + N_2)]^2$. See Vasicek, *Optics of Thin Films* (1960) at pages 69-70.

This equation indicates that the intensity of the reflected light is a function only of r and k, where r and k are defined as above. As a close approximation, R is a function only of the refractive index mismatch of the two polymer components and the total number of layer interfaces.

As can be seen, polymeric bodies comprised solely of optically thin layers are strongly dependent upon film (and individual layer) thickness to determine reflected wavelength. Such optically thin films are extremely sensitive to thickness changes, and it is characteristic of such thin films to exhibit nonuniform streaks and spots of color. Moreover, the perceived color varies with the angle of light incident on the surface of the film. Further, such films have limited forming ranges.

The present invention, however, combines the optically thin layers with optically thick or optically thick and very thin layers in a judicious manner which results in a polymeric reflective body which exhibits high reflectance while maintaining a uniform reflectance which avoids the color, streaking, and other undesirable characteristics associated with prior art optically thin films. Because the thin (iridescent) layers provide a constructive optical interference of light, the peak reflectance at certain wavelengths for the layers is very intense. When the thin layers are combined with the optically thick or optically thick and very thin layers, the overall reflectance of the body is significantly increased.

Figure 2:
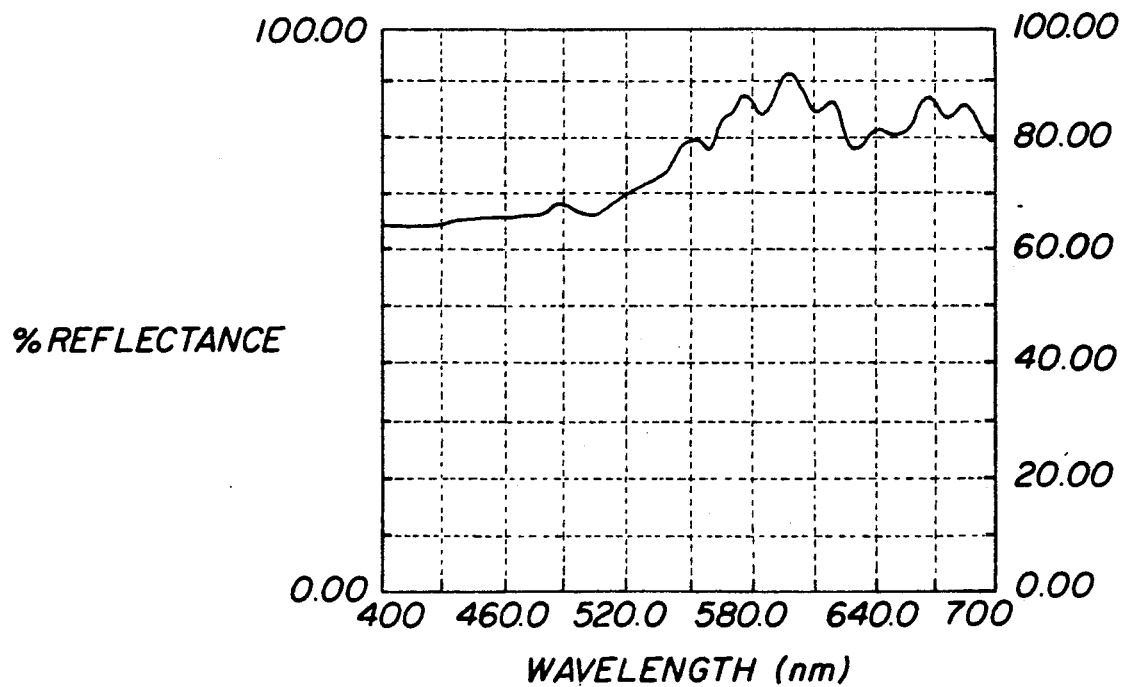
FIG. 2 is a graph illustrating the reflectance of an optically thin film placed on a stack of glass slides with air interfaces to simulate optically thick layers in accordance with Example 2.

A typical two component multilayer reflective polymer body in the form of a sheet 10 is shown schematically in FIG. 3. The body 10 includes alternating layers of first polymer (A) 12 having a refractive index, $n_1$, and a second polymer (B) 14 having a refractive index, $n_2$. FIG. 2 shows one form of the invention where all of the layers of first polymer A have an optical thickness of not less than 0.45 micrometers and all of the layers of second polymer B have an optical thickness of not more than 0.09 micrometers. FIG. 4 depicts a multilayer reflective polymer body which includes protective skin layers 16 of a third polymer (C) on both major exterior surfaces of the body.

Because the reflectance of an optically very thin or thick layer body is dependent upon refractive index mismatch and the number of layers in the body, to increase the reflectance of these bodies, either additional layers must be added, or polymers having more widely differing refractive indices utilized. Consequently, polymeric reflective bodies having high reflectivities in the range of 70-85% or greater could be produced only under very specific conditions. Because the present invention provides a reflective body which includes layers in the optical thickness range of 0.09 to 0.45 μm, the constructive optical interference from those optically thin layers boosts the overall reflectance of the body.

We have also found that a majority of the total layers of the polymeric reflective body may comprise thin layers having an optical thickness of between 0.09 μm and 0.45 μm provided that those layers have a gradient of optical thickness spanning that range. However, even if the thin layers do not have a gradient of layer thicknesses in the range of 0.09 μm to 0.45 μm, the desired noniridescent reflective appearance may still be achieved if the reflective contribution from the optically thick or optically thick and very thin layers is sufficient relative to the reflective contribution from the optically thin layers.

Figure 5:
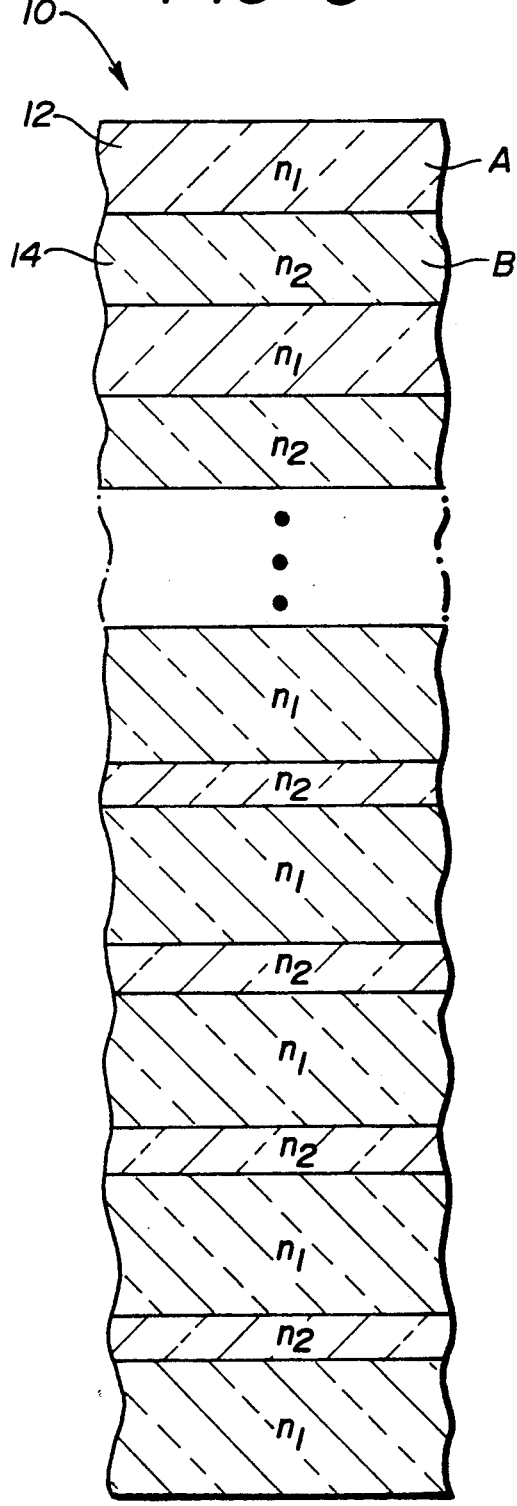
FIG. 5 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thin layers are positioned at one of the exterior surfaces and the optically thick/very thin layers are positioned at the other exterior surface.

The overall reflectance contribution from the individual layer types is somewhat dependent upon the positioning of the layers in the polymeric body with respect to the observer. The optically thin layers may be positioned so as to be nearest the observer while the optically thick or thick and very thin layers are positioned at the other exterior surface away from the observer as shown in FIG. 5. The complementary colors of light transmitted through the optically thin layers is reflected back to the observer by the optically thick or optically thick/very thin layers so that no iridescent color is perceived by the observer. Alternatively, the optically thick or optically thick and very thin layers may be positioned at the exterior surface nearest the observer while the optically thin layers are positioned at the other exterior surface away from the observer. The optically thick or optically thick and very thin layers greatly diminish the amount of light reaching the optically thin layers, reducing any iridescent effects perceived by the observer.

Figure 6:
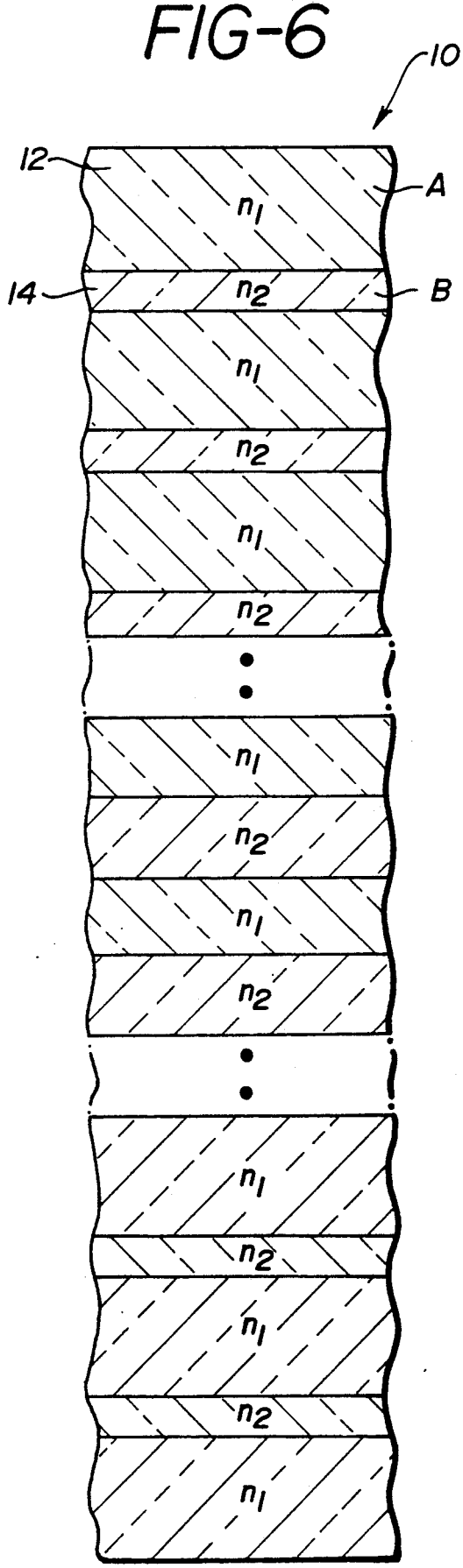
FIG. 6 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thin layers are positioned in the interior of the laminate and the optically thick/very thin layers are positioned at both exterior surfaces.

The layers may also be positioned such that the optically thin layers are on the exterior surfaces of the body and the optically thick or optically thick and very thin layers are positioned on the interior of the body as shown in FIG. 7. Alternatively, the optically thin layers may be positioned on the interior of the body while the optically thick or optically thick and very thin layers are positioned at the exterior surfaces of the body as shown in FIG. 6. However, it should be appreciated that many other combinations of the layer types may be made while maintaining a polymeric body in which there is substantially no visibly perceived iridescent color through the use of a combination of the mechanisms described above.

In another embodiment of the invention, as illustrated in FIG. 8, a pigmented layer 18 may be included in the polymeric body to provide a mirror-like quality to the body. The layers 12, 14 may be positioned such that the portion of the layers having an optical thickness in the range of between 0.09 and 0.45 μm is positioned at one of the exterior surfaces of the body, the portion of the layers having an optical thickness of not greater than 0.09 μm or not less than 0.45 μm is positioned in the interior of the body, and the pigmented layer 18 is positioned at the other exterior surface as shown in FIG. 9 Alternatively, the portion of the layers having an optical thickness of not greater than 0.09 μm or not less than 0.45 μm may be positioned at one exterior surface of the body, the portion of the layers having an optical thickness in the range of between 0.09 and 0.45 μm is positioned in the interior of the body, and the pigmented layer is positioned at the other exterior surface as shown in FIG. 10.

Figure 11:
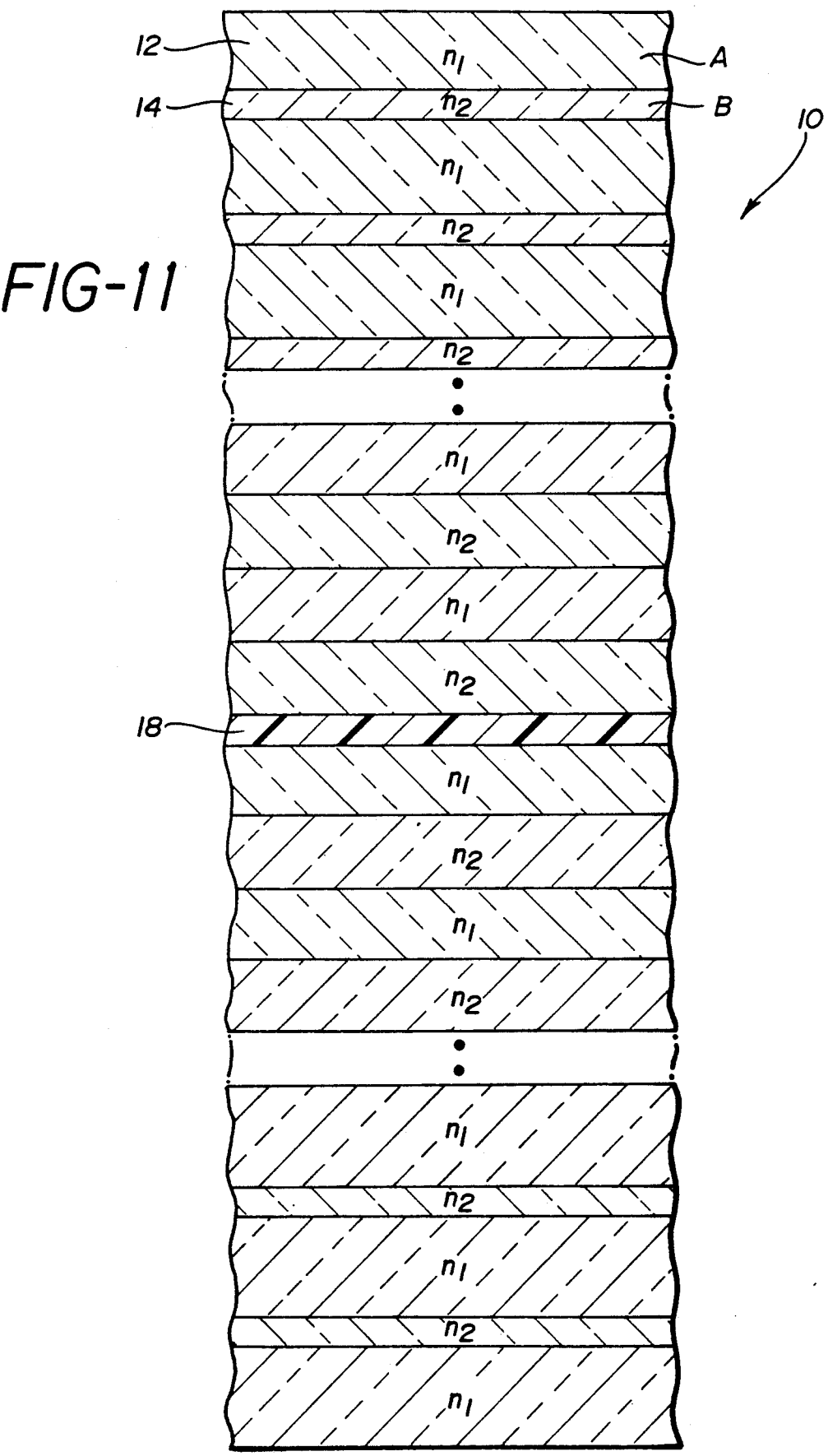
FIG. 11 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thick/very thin layers are positioned at both exterior surfaces of the body, and there is a pigmented layer positioned in the interior of the body, with the optically thin layers positioned on both sides of the pigmented layer.
Figure 12:
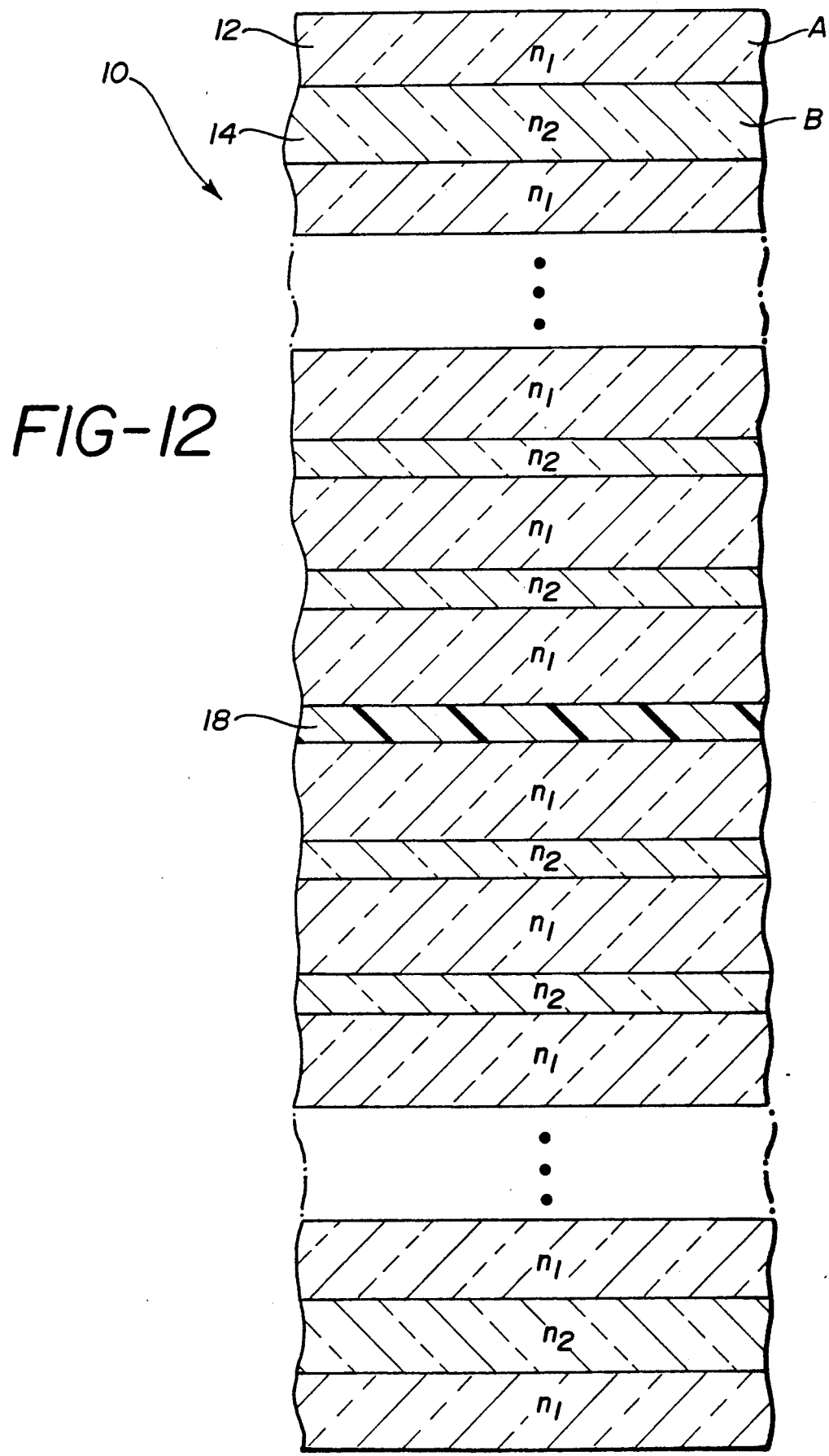
FIG. 12 is also a schematic cross-section of a two component multilayer polymeric reflective body of the present invention, where the first polymer, A, has a refractive index, $n_1$, and the second polymer, B, has a refractive index, $n_2$ with the layers arranged so that the optically thin layers are positioned at both exterior surfaces of the body, and there is a pigmented layer positioned in the interior of the body, with the optically thick/very thin layers positioned on both sides of the pigmented layer.

In other embodiments of the invention, the pigmented layer 18 may be positioned in the interior of the body, as shown in FIGS. 11 and 12. The layers 12, 14 may be arranged, for example, so that the portion of the layers having an optical thickness of not greater than 0.09 μm or not less than 0.45 μm are positioned at both exterior surfaces of the body with the portion of the layers having an optical thickness in the range of between 0.09 and 0.45 μm are positioned in the interior of the body adjacent the pigmented layer 18. Alteratively, the layers 12, 14 may be arranged so that the portion of the layers having an optical thickness in the range of between 0.09 and 0.45 μm are positioned at both exterior surfaces of the body, with the portion of the layers having an optical thickness of not greater than 0.09 μm or not less than 0.45 μm are positioned in the interior of the body adjacent the pigmented layer 18.

The overall effect of the combination of the layer types is dependent on the relationship between the baseline reflectance from the optically thick or optically thick and very thin layers and the peak reflectance from the optically thin layers. The perception factor, $P_f$, is a measure of how the eye perceives changes in the reflectance of the multilayer reflective body. It was experimentally determined that for a $P_f$ value of 0.5 or less, substantially no iridescent interference color is observed by the eye. For $P_f$ values of greater than 0.5, iridescent color can be observed. Perception factor is defined by the equation $P_f = (A - B)/B$, where A represents the peak reflectance of the polymeric body and B represents the average baseline reflectance of the polymeric body.

The reflectivity of the polymeric body is also affected by the total number of optically thick or optically thick and very thin layers used. The body becomes more highly reflective of incident light (i.e., transmits less light) as the total number of optically very thin and thick layers are increased. Preferably, the number of layers is sufficient to produce an article which will reflect at least 30% of the incident light, for those wavelengths for which there is negligible absorption. Reflectances below about 30% are not sufficient to be readily observed. If it is desired to use the reflective polymeric body of the present invention as a mirror, incorporating optically thin layers or adding additional optically thick or optically thick and very thin layers will increase the reflectance of the body to 50% or higher to produce a silvery, mirror-like appearance.

The reflectivity of the body is also affected by the difference in refractive index between the two polymers used for optically thick/very thin layers. That is, the greater the difference in refractive index, the greater the reflectivity of the body. Accordingly, it can be seen that the reflective nature of the polymeric bodies may be controlled by the selection of polymers for the optically thick or optically thick and very thin layers having differing refractive indices and by fabricating the body to have additional optically thick or optically thick and very thin layers.

The reflective multilayered polymeric bodies of the present invention may comprise alternating layers of a wide variety of generally transparent thermoplastic materials. Suitable thermoplastic resins, along with representative refractive indices, which may be used in the practice of the present invention include, but are not limited to: copolycarbonates of bisphenol and thiodiphenol (refractive index = 1.59 to 1.64), blends of polymethyl methacrylate and vinylidene fluoride (1.42 to 1.49), bisphenol A polycarbonate (1.59), copolymers of methyl methacrylate and vinylidene fluoride, polymethyl acrylate (1.48), polymethyl methacrylate (1.49), blends and copolymers of polymethyl methacrylate and polyvinylidene fluoride; copolymers of vinylidene fluoride and other halogenated monomers such as chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); copolymers of methyl methacrylate, vinylidene fluoride, and a monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; and blends of polyvinylidene fluoride and poly(vinyl acetate).

The refractive indices reported above may vary somewhat at different wavelengths. For example, the refractive index of polycarbonate is somewhat greater for light in the blue region of the spectrum and somewhat lower for light in the red region of the spectrum.

Copolymers of the above resins are also useful such as ethylene and vinyl alcohol, styrene and hydroxy ethylacrylate, styrene and maleic anhydride, styrene-butadiene block copolymers, styrene and methyl methacrylate, and styrene and acrylic acid. Other useful polymeric materials include polyetheretherketones, polybutene, maleic anhydride grafted polyolefins such as Admer (available from Mitsui Chemicals) and Plexar (available from Quantum Chemicals), and copolymers of ethylene and vinyl acetate such as CXA (available from du Pont). The latter three polymers are particularly useful as adhesive layers to bond other polymeric layers together in the multilayer construction.

A condition for the selection of the polymers to make up the layers of the body is that the polymers selected have refractive indices which differ from each other by at least about 0.03. Further, the polymers should preferably be compatible in processing temperatures so that they may be readily coextruded.

Multilayer bodies in accordance with the present invention are most advantageously prepared by employing a multilayered coextrusion device as described in U.S. Pat. Nos. 3,773,882 and 3,884,606, the disclosures of which are incorporated herein by reference. Such a device provides a method for preparing multilayered, simultaneously extruded thermoplastic materials. Preferably, a series of layer multiplying means as are described in U.S. Pat. No. 3,759,647, the disclosure of which is incorporated herein by reference, may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body.

Reflective polymeric bodies produced by the practice of the present invention may have a wide variety of potentially useful applications. For example, the bodies may be post formed into concave, convex, parabolic, half-silvered, etc. mirrors. If suitably flexible or rubbery polymers (elastomers) are utilized, the bodies may be bent or recoverably stretched into varying shapes. The mirror-like appearance may be accomplished by coextruding a black or otherwise light absorbing layer on one side of the body. Alternatively, one side of the final body may be coated with a colored paint or pigment to provide a highly reflective mirror-like body. Such mirrors would not be subject to breakage as would glass mirrors.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

The reflective polymeric bodies may also be used as birefringent polarizers. Through proper selection of the polymeric materials making up the layers, a refractive index mismatch in one plane of the polarizer may be achieved. In a preferred method, the refractive index mismatch may be created after fabrication of the reflective polymeric body. The polymeric materials may be selected so that the first material has a positive stress optical coefficient and the second polymeric material has a negative stress optical coefficient. Stretching the body containing the two polymeric materials in a uniaxial direction causes them to orient and results in a refractive index mismatch in the plane of orientation to produce the polarizer. A broad band width of visible light passing through such bodies is polarized. This is in distinction to prior thin film multilayer polarizers which polarized only specific narrow wavelength ranges of light.

Additionally, the highly reflective polymeric bodies may be fabricated as non-corroding metallic appearing articles for indoor or outdoor exposure. For example, the polymeric bodies may be fabricated into signs, or bright work for appliances. The bodies may be post formed into highly reflective parts such as automotive head lamp reflectors, bezels, hub caps, radio knobs, automotive trim, or the like, by processes such as thermoforming, vacuum forming, shaping, rolling, or pressure forming. The bodies may also be formed into silvery or metallic appearing bathroom or kitchen fixtures which do not corrode or flake.

A number of different profiles may be coextruded in addition to sheets and films of the reflective polymeric materials. By profiles, we mean shaping of the multilayer body 1) in a forming die into sheets, channels, lenticular cross-sections, round or elliptical tubes, and parisons, or 2) outside of a die by a post forming procedure. For example, decorative moldings such as wall moldings and picture frame moldings, automotive trim, home siding, and the like may be readily coextruded through forming dies. Use of a tubular extrusion die produces a multilayered metallic appearing pipe. Such tubular dies may also be used to produce parisons which may then be blow molded into silvery appearing bottles and containers. Because the materials used in the construction of the body may be selected for given desired properties, the final body may be flexible or rubbery, producing an article which could be used as a variable focal length reflector by flexing the article to different degrees.

The reflective polymeric bodies of the present invention may also be post formed into a wide variety of items such as two-way mirrors, infrared reflectors for insulation, and solar intensifiers to concentrate solar radiation. The bodies may also be formed into dinnerware, tableware, containers, and packages. By the proper selection of the polymers which are used, such articles may be made to be microwavable.

In order that the invention may be more readily understood, reference is made to the following examples, which are intended to be illustrative of the invention, but are not intended to be limiting in scope.

EXAMPLE 1

A multilayer reflective film was produced using microlayer coextrusion equipment as described in U.S. Pat. Nos. 3,773,882 and 3,884,606, incorporated herein by reference. The multilayer film comprised alternating layers of polycarbonate (CALIBRE® 300-22) and a blend of 40% by weight polyvinylidene fluoride (PVDF,. Kynar 720) and 60% by weight polymethyl methacrylate (PMMA, Acrylite H15003). The two materials were coextruded into 1313 alternating layers and capped on both surfaces of the sheet with polycarbonate skin (CALIBRE® 300-22). All melt temperatures were approximately 500° F., and the extruder pumping rates were as follows: 1) polycarbonate in the microlayer core: 40.6 lb/hr.; 2) PMMA/PVDF blend in microlayer core: 13.5 lb/hr.; 3) Polycarbonate in the skin: 15.5 lb/hr. The material was cooled on cooling rolls in an S-wrap configuration.

The multilayer film which was formed had a total thickness of about 82 mil (2083 μm), with the polycarbonate skin layers comprising about 22% of total film thickness. The 657 polycarbonate core layers had an average layer thickness of about 1.86 μm, and the 656 layers of the PMMA/PVDF blend had an average layer thickness of about 0.62 μm.

From microscopy, it was determined that a 3:1 layer thickness gradient existed for about 36% of the layers, while the remaining 64% of the layers were of a substantially uniform thickness. From the measured distribution of layer thicknesses, 236 layers of the PMMA/PVDF blend varied in optical thickness from about 0.25 μm to about 0.74 μm. Of these, 94 layers (40% of PMMA/PVDF layers or 7% of total layers) were in the iridescent optically thin film range of 0.09 μm to 0.45 μm. The optical thickness of the polycarbonate layers varied between about 0.8 μm and 2.4 μm, in the optically thick range.

The film sample obtained had an average reflectance of 85%, and little color was observed. The film possessed a significantly higher reflectance than a similar film but with all optically thick layers (85% versus 71%). The optically thin layers in the film contributed to the higher measured reflectance.

EXAMPLE 2

An optically thin (iridescent) film was prepared in accordance with the method taught in U.S. Pat. No. 3,711,176. A 115 layer film comprising polystyrene and a copolymer of ethylene and at least one unsaturated carboxylic acid (DuPont Surlyn A) was incorporated into a stack of 35 glass slides with air interlayers which were used to simulate optically thick layers. The peak reflectance for the film measured 92% at 595 nm with a baseline reflectance of sidebands of about 20% using a Beckman Instruments Model DU7HS spectrophotometer. The $P_f$ of the film was determined to be $(0.92-0.20)/0.20 = 3.6$ and was highly iridescent. See FIG. 1.

The iridescent film was then placed on the exterior surface of the 35 glass slides separated by air at the interfaces. The peak reflectance was again measured to be 92%. Baseline reflectance was measured to be about 65%. The $P_f$ was calculated to be $(0.92-0.65)/0.65 = 0.4$. See FIG. 2. Light reflected from the stack was substantially colorless.

The iridescent film was then placed between the tenth and eleventh glass slide counting from the top of the exterior surface. The baseline reflectance was 67% and the peak reflectance was 80%. The $P_f$ was calculated to be $(0.80-0.67)/0.67 = 0.2$. Light reflected from the samples were substantially colorless to the eye.

The iridescent film was then placed between the 21st and 22nd glass slide counting from the top of the exterior surface. Light reflected from the sample was colorless, and the sample appeared as a mirror with no perceptible color. The $P_f$ was calculated as follows: $(0.82-0.76)/0.76 < 0.1$.

EXAMPLE 3

116 optically thin layers of polystyrene (refractive index = 1.59) and 115 optically thin layers of polymethyl methacrylate (refractive index = 1.49) having thicknesses of 70 nm and 75 nm respectively were coextruded with 929 optically thick layers of polystyrene and 928 optically thick layers of polymethyl methacrylate. The average thickness of the optically thick layers was about 0.7 μm. The resulting sheet was substantially colorless and an average reflectance of about 70%. The calculated $P_f$ was about 0.43.

EXAMPLE 4

400 optically thin layers of polycarbonate (refractive index = 1.59) having a gradient layer thickness of between 65 nm and 110 nm and 400 optically thin layers of polymethyl methacrylate (refractive index = 1.49) having a gradient layer thickness between 65 nm and 150 nm were coextruded with 329 optically thick layers (approximately 0.7 μm) of polycarbonate and 328 optically thick layers (approximately 0.7 μm) of polymethyl methacrylate. The resulting sheet had the appearance of polished chrome with no iridescence. The 800 optically thin and the 657 optically thick layers reflected substantially across the entire visible spectrum.

What is claimed is:

1. A reflective polymeric body of at least first and second diverse polymeric materials, the body comprising a sufficient number of layers of said first and second polymeric materials such that at least 30% of light incident on said body is reflected, wherein said first and second Polymeric materials differ from each other in refractive index by at least about 0.03, and wherein said layers of said first and second polymeric materials have optical thicknesses such that $P_f \leq 0.5$, where $$P_f = (A - B)/B, \text{ and}$$

where $P_f$ is the visual perception factor, A is the peak reflectance from said polymeric body, and B is the baseline reflectance from said polymeric body.

2. The reflective polymeric body of claim 1 wherein a portion of said layers have optical thicknesses between 0.09 and 0.45 μm and the remaining layers have optical thicknesses of not greater than 0.09 μm or not less than 0.45 μm.

3. The reflective polymeric body of claim 2 where there is a gradient in the optical thickness of said layers having an optical thickness of between 0.09 and 0.45 μm across the layers.

4. The reflective polymeric body of claim 1 in which said first polymeric material is a polycarbonate and said second polymeric material is a miscible blend of polyvinylidene fluoride and polymethylmethacrylate.

5. The reflective polymeric body of claim 1 in which said first polymeric material is polystyrene and said second polymeric material is a copolymer of ethylene and at least one unsaturated monocarboxylic acid.

6. The reflective polymeric body of claim 1 in which said first polymeric material is polystyrene and said second material is polymethylmethacrylate.

7. The reflective polymeric body of claim 1 in which said first polymeric material is a polycarbonate and said second polymeric material is polymethylmethacrylate.

8. The reflective polymeric body of claim 1 in which said first and second polymeric materials are elastomers.

9. The reflective polymeric body of claim 1 in which said polymeric body is in the form of a sheet having two major exterior surfaces.

10. The reflective polymeric body of claim 9 in which said body includes a protective skin layer on at least one major surface thereof.

11. The reflective polymeric body of claim 1 wherein the portion of said layers having an optical thickness in the range of between 0.09 and 0.45 $\mu$m is positioned at one of the exterior surfaces of said body, and the portion of said layers having an optical thickness of not greater than 0.09 $\mu$m or not less than 0.45 $\mu$m is positioned at the other exterior surface.

12. The reflective polymeric body of claim 1 wherein the portion of said layers having an optical thickness of not greater than 0.09 $\mu$m or not less than 0.45 $\mu$m is positioned at the exterior surfaces of said body, and the portion of said layers having an optical thickness between 0.09 and 0.45 $\mu$m is positioned in the interior of said body.

13. The reflective polymeric body of claim 1 wherein the portion of said layers having an optical thickness between 0.09 and 0.45 $\mu$m is positioned at the exterior surfaces of said body, and the portion of said layers having an optical thickness of not greater than 0.09 $\mu$m or not less than 0.45 $\mu$m is positioned in the interior of said body.

14. The reflective polymeric body of claim 1 including a pigmented layer.

15. A reflective polymeric body of at least first and second diverse polymeric materials, the body comprising a sufficient number of layers of said first and second polymeric materials such that at least 30% of light incident on said body is reflected, with a portion of said layers having an optical thickness of between 0.09 and 0.45 $\mu$m, with the remaining layers having an optical thickness of not greater than 0.09 $\mu$m or not less than 0.45 $\mu$m, wherein said first and second polymeric materials differ from each other in refractive index by at least about 0.03, and wherein there is an absence of visibly perceived color reflected from said body.

16. The reflective polymeric body of claim 15 where there is a gradient in the optical thickness of said layers having an optical thickness of between 0.09 and 0.45 $\mu$m across the layers.

17. The reflective polymeric body of claim 15 in which said first polymeric material is polycarbonate said second polymeric material is a blend of polyvinylidene fluoride and polymethylmethacrylate.

18. The reflective polymeric body of claim 15 in which said first polymeric material is polystyrene and said second polymeric material is a copolymer of ethylene and at least one unsaturated monocarboxylic acid.

19. The reflective polymeric body of claim 15 in which said first polymeric material is polystyrene and said second material is polymethylmethacrylate.

20. The reflective polymeric body of claim 15 in which said first polymeric material is polycarbonate and said second polymeric material is polymethylmethacrylate.

21. The reflective polymeric body of claim 15 in which said polymeric body is in the form of a sheet having two major exterior surfaces.

22. The reflective polymeric body of claim 21 in which said body includes a protective skin layer on at least one major surface thereof.

23. The reflective polymeric body of claim 15 in which the portion of said layers having an optical thickness of between 0.09 and 0.45 $\mu$m comprises a pair of first and second polymers, and the portion of said layers having an optical thickness of not greater than 0.09 $\mu$m or not less than 0.45 $\mu$m comprises a pair of different first and second polymers.

24. The reflective polymeric body of claim 15 wherein the portion of said layers having an optical thickness in the range of between 0.09 and 0.45 $\mu$m is positioned at one of the exterior surfaces of said body, and the portion of said layers having an optical thickness of not greater than 0.09 $\mu$m or not less than 0.45 $\mu$m is positioned at the other exterior surface.

25. The reflective polymeric body of claim 15 wherein the portion of said layers having an optical thickness of not greater than 0.09 $\mu$m or not less than 0.45 $\mu$m is positioned at the exterior surfaces of said body, and the portion of said layers having an optical thickness between 0.09 and 0.45 $\mu$m is positioned in the interior of said body.

26. The reflective polymeric body of claim 15 wherein the portion of said layers having an optical thickness between 0.09 and 0.45 $\mu$m is positioned at the exterior surfaces of said body, and the portion of said layers having an optical thickness of not greater than 0.09 $\mu$m or not less than 0.45 $\mu$m is positioned in the interior of said body.

27. The reflective polymeric body of claim 15 including a pigmented layer.

28. A reflective polymeric body of at least first and second diverse polymeric materials, the body comprising a sufficient number of layers of said first and second polymeric materials such that at least 30% of light incident on said body is reflected, wherein said first and second polymeric materials differ from each other in refractive index by at least about 0.03, and wherein said layers of said first and second polymeric materials have optical thicknesses such that the Munsell chroma saturation value of light reflected from said body is /3 or less.

29. The reflective polymeric body of claim 28 wherein a portion of said layers have optical thicknesses between 0.09 and 0.45 $\mu$m and the remaining layers have optical thicknesses of not greater than 0.09 $\mu$m or not less than 0.45 $\mu$m.

30. The reflective polymeric body of claim 28 where there is a gradient in the optical thickness of said layers having an optical thickness of between 0.09 and 0.45 $\mu$m across the layers.

31. The reflective polymeric body of claim 28 in which said first polymeric material is a polycarbonate said second polymeric material is a blend of polyvinylidene fluoride and polymethylmethacrylate.

32. The reflective polymeric body of claim 28 in which said first polymeric material is polystyrene and said second polymeric material is a copolymer of ethylene and at least one unsaturated monocarboxylic acid.

33. The reflective polymeric body of claim 28 in which said first polymeric material is polystyrene and said second material is polymethylmethacrylate.

34. The reflective polymeric body of claim 28 in which said first polymeric material is a polycarbonate and said second polymeric material is polymethylmethacrylate.

35. The reflective polymeric body of claim 28 in which said polymeric body is in the form of a sheet having two major exterior surfaces.

36. The reflective polymeric body of claim 35 in which said body includes a protective skin layer on at least one major surface thereof.

37. The reflective polymeric body of claim 28 wherein the portion of said layers having an optical thickness in the range of between 0.09 and 0.45 μm is positioned at one of the exterior surfaces of said body, and the portion of said layers having an optical thickness of not greater than 0.09 μm or not less than 0.45 μm is positioned at the other exterior surface.

38. The reflective polymeric body of claim 28 wherein the portion of said layers having an optical thickness of not greater than 0.09 μm or not less than 0.45 μm is positioned at the exterior surfaces of said body, and the portion of said layers having an optical thickness between 0.09 and 0.45 μm is positioned in the interior of said body.

39. The reflective polymeric body of claim 28 wherein the portion of said layers having an optical thickness between 0.09 and 0.45 μm is positioned at the exterior surfaces of said body, and the portion of said layers having an optical thickness of not greater than 0.09 μm or not less than 0.45 μm is positioned in the interior of said body.

40. A reflective polymeric article having at least first and second major surfaces, said article comprising at least first and second diverse polymeric materials, the body comprising a sufficient number of layers of said first and second polymeric materials such that at least 30% of light incident on said body is reflected, wherein a portion of said layers have optical thicknesses between 0.09 and 0.45 μm and the remaining layers have optical thicknesses of not greater than 0.09 μm or not less than 0.45 μm, wherein said first and second polymeric materials differ from each other in refractive index by at least about 0.03, and wherein said article includes a pigmented layer.

41. The reflective polymeric article of claim 40 wherein the portion of said layers having an optical thickness in the range of between 0.09 and 0.45 μm is positioned at one of the exterior surfaces of said body, the portion of said layers having an optical thickness of not greater than 0.09 μm or not less than 0.45 μm is positioned in the interior of said body and said pigmented layer is positioned at the other exterior surface.

42. The reflective polymeric article of claim 40 wherein the portion of said layers having an optical thickness of not greater than 0.09 μm or not less than 0.45 μm is positioned at the exterior of said body, the portion of said layers having an optical thickness between 0.09 and 0.45 μm is positioned in the interior of said body and said pigmented layer is positioned at the other exterior surface.

43. The reflective polymeric article of claim 40 wherein the portion of said layers having an optical thickness of not greater than 0.09 μm or not less than 0.45 μm is positioned at the exterior surfaces of said body, said pigmented layer is positioned in the interior of said body, and portions of said layers having an optical thickness between 0.09 and 0.45 μm are positioned adjacent said pigmented layer on both sides thereof.

44. The reflective polymeric article of claim 40 wherein the portion of said layers having an optical thickness of between 0.09 and 0.45 μm is positioned at the exterior surfaces of said body, said pigmented layer is positioned in the interior of said body, and portions of said layers having an optical thickness not greater than 0.09 μm or not less than 0.45 μm are positioned adjacent said pigmented layer on both sides thereof.

45. A birefringent light polarizer which reflects light anisotropically, comprising multiple layers of at least first and second diverse polymeric materials, a portion of said layers having an optical thickness of between 0.09 and 0.45 μm, with the remaining layers having an optical thickness of not greater than 0.09 μm or not less than 0.45 μm, wherein said first and second polymeric materials differ from each other in refractive index by at least about 0.03 in one plane of the polarizer.

* * * * *